United States Patent Office
3,288,811
Patented Nov. 29, 1966

3,288,811
SYNTHESIS OF STEROIDS
Gerald W. Krakower, Elizabeth, and Hilda Van Dine, Princeton, N.J., assignors to E. R. Squibb & Sons, Inc., New York, N.Y., a corporation of Delaware
No Drawing. Filed Feb. 10, 1966, Ser. No. 526,356
4 Claims. (Cl. 260—345.2)

This application is a continuation-in-part of prior filed application, Serial No. 457,499, filed May 20, 1965.

This invention relates to and has as its object the provision of new physiologically active steroids, novel methods for their production and new intermediates useful in said preparation. More particularly, this invention relates to the preparation of compounds of the formula:

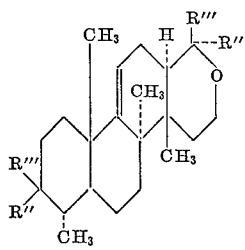

wherein R''' is hydrogen and R'' is hydroxy or acyloxy; and together R'' and R''' is oxo (O=).

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The final products of this invention wherein R'' and R''' together is oxo in the 17-position are physiologically active steroids which possess uterotriphic activity and may be used in the treatment of such conditions as menstrual disorders and compounds of this invention wherein R'' is hydroxy or acyloxy and R''' is hydrogen are physiologically active steroids which possess anti-androgenic activity, (i.e., they can be utilized in the treatment of such conditions as hyperandrogenic acne). These compounds are formulated for such administration in the manner and/or dosage as determined by the respective compound involved and the requirements of the patient.

The final compounds of this invention may be prepared according to the processes of this invention which may be represented by the following equations wherein R'' and R''' are as hereinbefore defined:

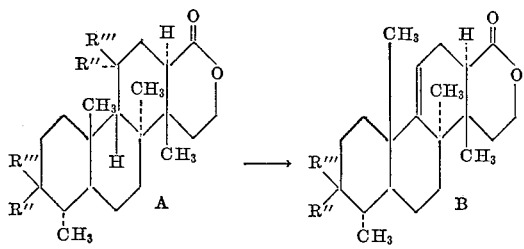

In the first step of the novel process of this invention, the starting materals (Compounds A) are reduced as by treatment with a reducing agent, for example, an alkali metal borohydride, such as sodium borohydride, to yield the 11-hydroxy-16 unsubstituted derivatives thereof. The starting materials (Compounds A) which may be employed in the practice of this invention are those which may be prepared by reducing a compound having the formula

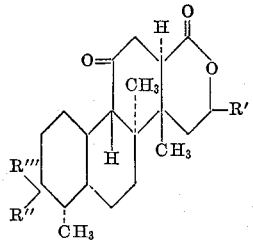

wherein R' is acyloxy and R'' and R''' are as defined herein with a reducing agent, such as alkali metal borohydride, e.g., sodium borohydride to yield 11-hydroxy-16-unsubstituted derivatives.

To obtain the 11-acylated starting compounds of this invention, the corresponding 11-hydroxylated derivatives may be acylated under acetic conditions, as by treatment with acid, acid anhydride, and toluene sulphonic acid. The 3-hydroxy compounds may be mono-acylated as by treatment with an acylating agent, for example, acid anhydride or acyl halide in the presence of an organic base, such as collidine or pyridine, to yield the 3-acylated derivatives. The processes for preparing the starting materials of the instant invention are more fully set forth in a prior application, Serial No. 419,231, filed December 17, 1964, in the names of Gerald W. Krakower and Hilda Anne Schwartz.

The 3,11-dihydroxy compounds are first mono-acylated as by treatment with an acylating agent, for example, acid anhydride or acyl halide, in the presence of an organic base, such as collidine or pyridine, to yield the 3-acylated-11-hydroxy derivatives.

The 3-acylated-11-hydroxy derivatives may then be dehydrated as by treatment with a dehydrating agent, for example, an inorganic acid halide such as thinoyl chloride in an organic base, such as collidine or pyridine to yield the 3-acyloxy-9,11-dehydro novel final products of the instant invention. These final products may be also utilized as intermediates in the preparation of 3β,17aα-dihydroxy and 3β-acyloxy-17aα-hydroxy derivatives of this invention. The 3-acyloxy-9,11-dehydro compound may be reduced as by treatment with a reducing agent, for example, an alkali metal borohydride, such as sodium borohydride, to yield these derivtive, i.e., 3β,17aα-dihydroxy and 3α-acyloxy-17aα-hydroxy steroids of the invention.

In addition, the 3-acyloxy-9-11-dehydro final products may be further treated to yield the other novel final products of this invention. The 3-acyloxy-9,11-dehydro compounds may be hydrolized as by treatment with an alcoholic alkali metal hydroxide, for example, ethanolic potassium hydroxide to yield the 3-hydroxy-9,11-dehydro novel final products of this invention.

The 3-hydroxy-9,11-dehydro and 3,17-dihydroxy final products may then be oxidized as by treatment with an oxidizing agent, such as chromic acid to yield the 3,17-diketo-9,11-dehydro final products of this invention.

The invention may be further illustrated by the following examples:

Example 1.—3α - acetoxy-11α-hydroxy-4α,8,14-trimethyl-17-oxa-D-homo-18-nor-5α,8α,9β,13α,14β - androstane-17α-one A suspension of 250 mg. of 3α,16β-diacetoxy-4α,8,14-trimethyl-17-oxa-D-homo-18-nor-5α,8α,9β13α,14β - andstane-11,17α-dione in 25 ml. of absolute ethanol is treated with 125 mg. of sodium borohydride, and stirred at room temperature. After ten minutes the substrate dissolves and after seventy-five minutes the reaction mixure is acidified with glacial acetic acid. The solvent is evaporated and the residue is taken up in ethyl acetate. After washing with saturated salt solution drying and evaporation of the solvent, 210 mg. of crystalline material is obtained. Two recrystallizations from methanol give 84 mg. of analytically pure 3α-acetoxy-11α-hydroxy-4α8,14-trimethyl-17 - oxa-D-homo-18-nor-5α,8α,9β,13α,14β-androstane-17α-one, M.P. 209–212° C., $[\alpha]_D^{31}$ —55.5°.

*Analysis.*—Calc'd for $C_{23}H_{36}O_5$: C, 70.37; H, 9.24. Found: C, 70.00; H, 9.66.

*Example 2.—3α-acetoxy-4α,8,14 - trimethyl - 17 - oxa-D-homo-18-nor-5α,8α,9β,13α,14β-androstane-11,17a-dione*

A solution of 48 mg. of 3α-acetoxy-11α-hydroxy-4α,8,14-trimethyl-17-oxa - D - homo-18-nor-5α,8α,9β,13α, 14β-androstane-17a-one in 2 ml. of acetone is treated with an excess of chromic acid-sulfuric acid reagent. After five minutes at room temperature, the excess chromic acid is reduced with methanol and the solution diluted with water. The solvent is evaporated and the aqueous suspension is extracted with methylene chloride. The methylene chloride solution is washed with saturated salt solution, dried and evaporated to give 34 mg. of material. Recrystallization from methanol gives 20 mg. of 3α-acetoxy-4α,8,14-trimethyl-17-oxa-D - homo-18-nor-5α,8α,9β, 13α,14β-androstane-11,17a-dione, M.P. 214–215° C., $[\alpha]_D^{32}$ —9.4°.

*Analysis.*—Calc'd for $C_{23}H_{34}O_5$: C, 70.74; H, 8.78. Found: C, 70.78; H, 8.74.

*Example 3.—3β,11α-dihydroxy-4α,8,14-trimethyl-17-oxa-D-homo-18-nor-5α,8α,9β,13α,14β-androstane-17a-one*

A suspension of 400 mg. of 16β-acetoxy-4α,8,14-trimethyl-17-oxa-D - homo-18-nor-5α,8α,9β,13α,14β-androstane-3,11,17a-trione in 40 ml. of absolute ethanol is treated with 300 mg. of sodium borohydride and stirred at room temperature for three hours. The reaction is then worked up as described in Example 1 to give 373 mg. of crude 3β,11α-dihydroxy-4α,8,14 - trimethyl - 17-oxa-D-homo-18-nor - 5α,8α,9β,13α,14β - androstane - 17a - one. Recrystallization from methanol gives 79 mg., 279–284° C. The analytical sample has M.P. 283–284° C.

*Analysis.*—Calc'd for $C_{21}H_{34}O_4$: C, 71.96; H, 9.78. Found: C, 72.00; H, 9.60.

*Example 4.—3β-acetoxy-11α - hydroxy-4α,8,14-trimethyl-17-oxa-D-homo-18-nor - 5α,8α,9β,13α,14β - androstane-17a-one*

3β,11α-dihydroxy-4α,8,14-trimethyl-17 - oxa-D - homo-18-nor-5α,8α,9β,13α,14β-androstane-17a-one is dissolved in a mixture of pyridine-acetic anhydride and left overnight at room temperature. After addition of water the mixture is evaporated and the residue recrystallized from methanol to give 3β-acetoxy-11α-hydroxy-4α,8,14-trimethyl-17-oxa - D-homo-18-nor - 5α,8α9β,13α,14β-androstane-17a-one, M.P. 197–198° C., $[\alpha]_D$ —13.5° (chloroform).

*Analysis.*—Calc'd for $C_{23}H_{36}O_5$: C, 70.37; H, 9.24. Found: C, 70.51; H, 9.18.

Similarly, following the procedure of Example 4, but susbstituting equivalent amounts of other acylating agents, for example, propionyl anhydride or benzoyl chloride for acetic anhydride, there is obtained the respective 3-propionate and 3-benzoate derivatives.

*Example 5.—3β-acetoxy-4α,8,14 - trimethyl-17 - oxa-D-homo-18-nor-5α,8α,13α,14β-androst-9(11)-ene-17α-one*

A solution of 50 mg. of thionyl chloride in 0.5 ml. of pyridine is added to 50 mg. of 3β-acetoxy-11α-hydroxy-4α,8,14-trimethyl-17 - oxa-D-homo-18-nor - 5α,8α,9β,13α, 14β-androstane-17a-one in 1 ml. of pyridine cooled to —20° C. The reaction mixture is kept at 0° C. for thirty minutes and then quenched with water and extracted with ethyl acetate. The ethyl acetate solution is washed with 5% hydrochloric acid and saturated sodium chloride solution, dried and evaporated to give 43 mg. of crude material. Recrystallization from methanol gives 22 mg. of 3β-acetoxy-4α,8,14-trimethyl - 17-oxa-D-homo-18-nor-5α, 8α,13α,14β-androst-9(11)-ene-17a-one, M.P. 255°–256° C., $[\alpha]_D$ —30.2° (chloroform).

*Analysis.*—Calc'd for $C_{23}H_{34}O_4$: C, 73.76; H, 9.15. Found: C, 73.64; H, 9.12.

*Example 6.—3β - hydroxy - 4α,8,14-trimethyl-17-oxa-D-homo-18-nor-5α,8α,13α,14β-androst-9(11)-ene-17a-one*

A solution of 81 mg. of 3β-acetoxy-4α,8,14-trimethyl-17 - oxa - D - homo-18-nor-5α,8α,13α,14β-androst-9(11)-ene-17a-one, in 25 ml. of 5% ethanolic potassium hydroxide is left overnight at room temperature. The solution is then acidified with 20% sulfuric acid, diluted with water and the solvent evaporated. The aqueous suspension is extracted with ethyl acetate and washed with saturated salt solution, dried and evaporated to give crude 3β-hydroxy - 4α,8,14 - trimethyl-17-oxa-D-homo-18-nor-5α,8α, 13α,14β-androst-9(11)-ene-17a-one.

*Example 7.—4α,8,14-trimethyl-17-oxa-D-homo-18-nor-5α,8α,13α,14β-androst-9(11)-ene-3,17a-dione*

Oxidation of the material of Example 6 with chromic acid-sulfuric acid as described in Example 2 gives crude 4α,8,14 - trimethyl-17-oxa-D-homo-18-nor-5α,8α,13α,14β-androst-9(11)-ene-3,17a-dione.

*Example 8.—3β,17aα - dihydroxy - 4α,8,14-trimethyl-17-oxa - D-homo-18-nor-5α,8α,13α,14β-androst-9(11)-ene and 3β-acetoxy-17aα-hydroxy-4α,8,14-trimethyl-17-oxa-D-homo-18-nor-5α,8α,13α-14β-androst-9(11)-ene*

To a solution of 500 mg. of 3β-acetoxy-4α,8,14-trimethyl - 17 - oxa-D-homo-18-nor-5α,8α,13α,14β-androst-9(11)-ene-17a-one in 20 ml. of dioxone is added 500 mg. of sodium borohydride in 20 ml. of 1:1 dioxane-water. The mixture is stirred at room temperature for seventeen hours and then glacial acetic acid is added to decompose excess borohydride. The solution is acidified to pH 2 with 5% hydrochloric acid and the solvent evaporated. The residue is only partially soluble in ethyl acetate. The insoluble portion, 166 mg., on recrystallization from methanol, affords 3β,17aα - dihydroxy - 4α,8,14-trimethyl-17 - oxa - D - homo-18-nor-5α,8α,13α,14β-androst-9(11)-ene, M.P. 238–242° C., $[\alpha]_D$—36° (methanol).

*Analysis.*—Calc'd for $C_{21}H_{34}O_3$: C, 75.40; H, 10.25. Found: C, 75.26; H, 10.41.

The ethyl acetate solution described above is washed with water until neutral, and the solvent evaporated to give 365 mg. of material melting 180–185° C. On repeated recrystallization from methanol, small amounts of the dihydroxy compound continue to crystallize, M.P. 234–238° C. Concentration of the mother liquors gives 3β - acetoxy - 17aα-hydroxy-4α,8,14-trimethyl-17-oxa-D-homo-18-nor-5α,8α,13α,14β-androst-9(11)-ene, M.P. 190–192° C., $[\alpha]_D$—12° (methanol).

*Analysis.*—Calc'd for $C_{23}H_{36}O_4$: C, 73.36; H, 9.64. Found: C, 72.77; H, 10.06.

*Example 9.—3β,17aα - diacetoxy - 4α,8,14-trimethyl-17-oxa-D-homo-18-nor-5α,8α,13α,14β-androst-9(11)-ene*

The crude mixture from the sodium borohydride reduction of 100 mg. of 3β-acetoxy-4α,8,14-trimethyl-17-oxa-D - homo - 18-nor-5α,8α,13α,14β-androst-9(11)-ene-17a-one is dissolved in a mixture of 2 ml. of pyridine and 1 ml. acetic anhydride and left overnight at room temperature. Water is added to the reaction mixture and it is then evaporated in vacuo. Recrystallization of the residue from methanol gives 73 mg. of 3β,17aα-diacetoxy-4α,8,14-trimethyl - 17-oxa-D-homo-18-nor-5α,8α,13α,14β-androst-9(11)-ene, M.P. 95–96° C. The analytical sample has M.P. 98–99° C. $[\alpha]_D$—10° (methanol).

*Analysis.*—Calc'd for $C_{25}H_{38}O_5$: C, 71.74; H, 9.15. Found: C, 71.55; H, 9.24.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A compound of the formula

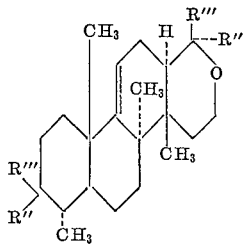

wherein R''' is hydrogen; R'' is selected from the group consisting of hydroxy and acyloxy, wherein the acyl radical is of a hydrocarbon carboxylic acid of less than twelve carbon atoms.

2. A compound in accordance with claim 1 having the name 3β,17aα-dihydroxy-4α,8,14-trimethyl-17-oxa-D-homo-18-nor-5α,8α,13α,14β-androst-9(11)-ene.

3. A compound in accordance with claim 1 having the name 3β-acetoxy-17aα-hydroxy-4α,8,14-trimethyl-17-oxa-D-homo-18-nor-5α,8α,13α,14β-androst-9(11)-ene.

4. A compound in accordance with claim 1 having the name 3β,17aα - diacetoxy - 4α,8,14-trimethyl-17-oxa-D-homo-18-nor-5α,8α,13α,14β-androst-9(11)-ene.

No references cited.

WALTER A. MODANCE, *Primary Examiner.*

JAMES A. PATTEN, *Assistant Examiner.*